United States Patent [19]

Dutt

[11] Patent Number: 4,996,094
[45] Date of Patent: Feb. 26, 1991

[54] ONE-SIDED CLING/ONE-SIDED SLIP STRETCH WRAP FILMS

[75] Inventor: William M. Dutt, Pittsford, N.Y.

[73] Assignee: Mobil Oil Corporation, Fairfax, Va.

[21] Appl. No.: 249,525

[22] Filed: Sep. 26, 1988

[51] Int. Cl.$^5$ ................................................ B32B 7/02
[52] U.S. Cl. ..................................... 428/212; 428/218; 428/349; 428/516; 428/520
[58] Field of Search ............... 428/349, 516, 520, 218, 428/212

[56] References Cited

U.S. PATENT DOCUMENTS

| | | | |
|---|---|---|---|
| 3,986,611 | 10/1976 | Dreher | 206/386 |
| 4,050,221 | 9/1977 | Lancaster, III et al. | 53/211 |
| 4,076,698 | 2/1978 | Anderson et al. | 526/348 |
| 4,079,565 | 3/1978 | Lancaster, III et al. | 53/3 |
| 4,205,021 | 5/1980 | Morita et al. | 525/240 |
| 4,267,240 | 5/1981 | Jaisle et al. | |
| 4,268,578 | 5/1981 | Bordini et al. | 428/484 |
| 4,311,808 | 1/1982 | Su | 525/222 |
| 4,348,455 | 9/1982 | Clayton | 428/336 |
| 4,367,256 | 1/1983 | Biel | 428/218 |
| 4,399,173 | 8/1983 | Anthony et al. | 428/35 |
| 4,399,180 | 8/1983 | Briggs et al. | 428/212 |
| 4,409,776 | 10/1983 | Usui | 53/399 |
| 4,418,114 | 11/1983 | Briggs et al. | 428/218 |
| 4,518,654 | 5/1985 | Eichbauer et al. | 428/331 |
| 4,522,987 | 6/1985 | Hogan et al. | 526/106 |
| 4,588,650 | 5/1986 | Mientus et al. | 428/516 |
| 4,671,987 | 6/1987 | Knott, II et al. | 428/216 |
| 4,820,589 | 4/1989 | Dobreski et al. | 428/516 |

*Primary Examiner*—Edith Buffalow
*Attorney, Agent, or Firm*—A. J. McKillop; C. J. Speciale; M. J. Mlotkowski

[57] ABSTRACT

A stretch wrap film having one surface with cling properties and the other with noncling properties, one noncling property being a slip property exhibited when the noncling surface is in contact with a like surface of itself with relative motion therebetween having the improvement which is comprised of positioning at least one region between the cling and noncling surfaces of the film, said region being of a material selected to provide barrier properties sufficient to maintain the cling and noncling properties of the cling and noncling surfaces. A high number average molecular weight cling additive is used to reduce additive migration and transfer.

18 Claims, No Drawings

ONE-SIDED CLING/ONE-SIDED SLIP STRETCH WRAP FILMS

FIELD OF THE INVENTION

The present invention is directed to stretch wrap films and, in particular, to stretch wrap films having a high degree of cling on one-side thereof and the ability to exhibit a slide or slip property on the other side. The films of the present invention are particularly useful for the spin wrapping of palletized loads.

BACKGROUND OF THE INVENTION

The use of thermoplastic stretch wrap for the overwrap packaging of goods, and in particular, the unitizing of pallet loads, is currently developing commercial end use application for thermoplastic films including, generically, polyethylene. There are a variety of overwrapping techniques which are employed utilizing such stretch wrap films, including locating the pallet load to be wrapped atop a rotating platform. As the stretch wrap film is laid on about the girth of the pallet load, the pallet load is rotated on its platform. The stretch wrap is applied from a continuous roll thereof. In one type of wrapper, braking tension is applied to the continuous roll of film so that the film is being continuously stretched by the rotating pallet load. Usually the stretch wrap film, located adjacent to the rotating pallet load, is vertically positioned and the rotating platform or turntable may be operated at speeds ranging from about 5 to about 50 revolutions per minute. At the completion of the overwrap operation, the turntable is stopped completely while the film is cut and attached to the previous layer of film by employing tack sealing, adhesive tape, spray adhesives, etc. Depending upon the width of the stretch wrap roll, the load being overlapped may be shrouded in the film while the vertically positioned film roll remains fixed in a vertical position, or the vertically positioned film roll (for example in the case of relatively narrow film widths and relatively wider pallet loads) may be arranged to move in a vertical direction as the load is being overwapped whereby a spiral wrapping effect is achieved on the package goods.

Some of the properties desired of a good stretch wrap film are as follows:

Good cling or cohesion properties.
Good transparency.
Low stress relaxation with time.
Good puncture resistance.
High resistance to transverse tear when under machine direction tension.
Producible in thin gauges.
Low specific gravity and thus high yield in area per pound.
High machine direction ultimate tensile strength.
High machine direction ultimate elongation.
High modulus of elasticity.
High tear resistance in the transverse direction.
High puncture resistance.

The recently developed linear low density polyethylenes have the desired strength and toughness properties required from stretch wrap applications, but do not possess the required cling, which in the case of conventional polyethylene, can be partially obtained by incorporation of vinyl acetate as a comonomer.

It is known in the art to include cling additives in order to impart an increased cling force between two contacting films. For example, household cling wrap film, used to cover dishes containing leftover food must have the ability to cling to smooth surfaces made of glass, ceramic, and plastic. Examples of such cling wrap film are described in U.S. Pat. Nos. 4,348,455 and 4,367,256 the disclosures of which are in their entirety incorporated herein by reference. In both of these teachings the cling wrap additive (alkali metal dialkyl sulfosuccinate in one case, and glycerol oleates in the other case) are incorporated uniformly throughout the film so that the cling force on one side of the film is substantially the same as that of the other side of the film.

The incorporation of such cling agents in a stretch wrap film employed for the unitizing of pallet loads presents a serious and expensive problem. While the employment of such a cling modified stretch wrap film will enhance and strengthen the bonding of the overlap film after the load has been stabilized there if the tendency of one stabilized load to cling or drag against an adjacent load causing transportation and handling problems. Because of the cling nature of the overwrap, one such overwrapped pallet load will not slide against an adjacent load. The tendency is for one load to pull destructively upon an adjacent load because of the clinging nature of the film. Pallet loads are moved about by fork lift trucks and the forces involved can and do pull through the stretch wrap film and destroy the integrity of the overwrapped load. An example of a film possessing cling properties on one side, while the other side exhibits substantially no cling force when in contact with a layer of itself, is provided in U.S. Pat. No. 4,518,654, the disclosure of which is hereby incorporated by reference in its entirety.

U.S. Pat. No. 4,518,654 discloses a bi-layer A/B film structure wherein the base polymer of layer A, possessing no substantial cling characteristics of its own, is modified by the uniform dispersion therein of a cling additive in an amount sufficient to maintain layer A in a stretched condition in cling contact with layer B. Layer B contains an anticling additive, uniformly dispersed, of a character and in an amount sufficient to prevent any substantial cling force to be exerted when in contact with a layer of itself. The films disclosed therein are preferably coextruded.

While cling additives, also known as tackifiers, are commonly believed to work by migrating to the surface of a film, their ability to migrate can pose special problems when seeking to provide effective stretch wrap films. For example, should the cling additive migrate to the noncling region of the film and seek residence on the surface of same, the noncling properties of that side of the film will be substantially impaired. Likewise, should the anticling additive migrate to the cling surface of the film, the ability of the cling surface to maintain cling-contact in use may be reduced or destroyed.

In view of the problems associated with additive migration in one-sided cling stretch wraps, it is an object of this invention to provide a polymeric film having the proper combination of properties of overcome these problems and thereby provide stretch wrap films especially well suited for use in palletizing applications.

It is a further object to overcome these problems in an effective and economical manner.

It is a yet further object to provide an improved one-sided cling, one-sided noncling or slip film wherein the noncling side exhibits a low dynamic coefficient of friction, noncling surface to noncling surface.

SUMMARY OF THE INVENTION

In accordance with the present invention, an improved stretch wrap film is provided having one surface with cling properties and the other surface with noncling properties. One noncling surface property provided is a slip property which is exhibited when the noncling surface is in contact with a like noncling surface with relative motion therebetween. The base polymer used to provide the surface having cling properties is a thermoplastic polymer which in film form does not possess substantial cling force to a layer of itself and requires modification by the uniform dispersion thereof of a cling additive in an amount sufficient to maintain the cling surface, in its stretched condition, in cling contact with the noncling surface. The base polymer used for the noncling surface has its noncling properties improved through the use of an anticling additive dispersed therein in an amount sufficient to prevent the imparting of any substantial cling force to a layer of itself. In the improved stretch wrap films of this invention are cling and noncling properties are maintained by the reduction of additive migration from the cling surface to the noncling surface and vice versa. At least one intermediate polymer region is provided wherein the polymer is selected on the basis of its stretch capability in film form and its barrier properties vis-a-vis the cling and anticling additives. In one embodiment, a high molecular weight cling additive is used which has a reduced tendency to migrate through the film or transfer from the cling surface to other surfaces. The use of an effective anticling additive together with the particular combination of components of this invention provides stretch wrap films having a reduced coefficient of dynamic friction.

These films are preferably coextruded together so that inspite of the cling and anticling character of the individual films, the coextrusion at elevated temperature creates a bond at the interface thereof sufficiently strong such that during ordinary use the integrity of the interfaces are maintained. It is preferred that the film be transparent so that pallet wrapped loads will reveal the identity of the stabilized goods for inventory confirmation purposes. By "transparent" is meant, the film does not obscure the identity of the wrapped items. This does not exclude a colored, tinted or opaque film. Other films or layers of specific function may be interposed between the cling and noncling surfaces.

DETAILED DESCRIPTION OF THE PREFERRED EMBODIMENTS

Any thermoplastic film capable of being fashioned into a stretch wrap film is contemplated for use herein. An important characteristic for initial consideration in polymer selection for stretch wraps is its ability to stretch and resist stress relaxation. As is known, with time, stresses are relaxed in those applications where they are developed from elastic elongation. The time required for the adjustment of stresses is called the relaxation time, which recognizes that the adjustment of stresses is a continuous phenomena.

Preferred thermoplastic films suitable for use in the present invention are the polyolefins such as polyethylene, polypropylene, copolymers of ethylene and propylene, and polymers obtained from ethylene or propylene copolymerized with relatively minor amounts of other mono-olefinic monomers such as butene-1, isobutylene, acrylic acids, esters of acrylic acids, vinyl acetate, styrene and the like or combinations thereof. Preferred for the subject film is, generically polyethylene, including, high and low molecular weight polyethylene and copolymers thereof. Particularly preferred for the cling and intermediate barrier film portions of the coextruded stretch wrap film of the present invention is linear low density polyethylene (LLDPE). This material actually is a copolymer of ethylene with a $C_4$–$C_{10}$ olefin, for example, butene-1, 1,3-methyl-butene-1, 1,3-methyl-pentene-1, hexene-1, 4-methyl-pentene-1, 3-methyl-hexene-1, octene-1, decene-1, etc. The alpha-olefin is usually present in from 1–10 weight percent of the copolymer. A typical manufacturing process for the formation thereof is disclosed in U.S. Pat. Nos. 4,076,698 and 4,205,021, the disclosures of which are in their entirety incorporated herein by reference. The preferred LLDPE has a density ranging from about 0.915 to about 0.940 gm/c.c. This material preferably has a melt index of from about 1 to about 6. Even more particularly preferred for the cling film portion is very low density linear polyethylene (VLDPE), also referred to as ultralow density polyethylene (ULDPE). The VLDPE is a linear nonpolar polymer of narrow molecular weight distribution. It too is a copolymer of ethylene and at least one comonomer selected from $C_4$ to $C_{10}$ alpha-olefins, the copolymer having a density of below 0.915, such as between 0.890 and below 0.915. The melt index of the VLDPE copolymer is in the range of from 0.1 to about 10. The copolymer resins are commercially available and consequently, for the purpose of this invention, the process for their production need not be discussed. The VLDPE can be blended with another ethylene polymer such as polyethylene homopolymer, ethylene-vinyl acetate copolymer, linear low density polyethylene and mixtures of these compounds.

Similarly, while any thermoplastic noncling film can be employed as the noncling layer of this coextruded film structure, it is preferred that this layer also be a polyolefin. The noncling layer of the coextruded stretch wrap of the present invention is preferably fabricated from a high density polyethylene (HDPE) resin. This polymeric material will have a density of greater than above about 0.940 and preferably between about 0.950 to about 0.955. The preferred range of melt indices is from about 1 to about 25, with from about 10 to about 20 particularly preferred.

The cling side of the stretchwrap film can contain any known cling agent uniformly dispersed therein to an extent effective to remain in cling contact with the noncling layer while both are in the stretched condition. Examples of cling additives include, for example, polyisobutylene, having a number average molecular weight in the range of from about 1,000–3,000 grams per mole as measured by a vapor phase osmometry. Other examples are amorphous atactic polypropylenes, e.g., number average M.W. of 2000 and the polyterpenes. The cling additive can be present in the cling layer in a concentration of from about 0.5 to about 20 pounds per 100 pounds of resin.

Particularly preferred as a cling additive is a high number average molecular weight polyisobutylene. Its use as a tackifier results in little or no tack transfer to the noncling side of the film. A 2600 number average molecular weight polyisobutylene shows less tack transfer and migration than a lower molecular weight cling additive. Less tack transfer and migration are favorable when producing a one-sided cling/one-sided slip stretch film.

Although unconfirmed, it is believed that the high molecular weight molecules are "caught" in the polyethylene structure and cannot be readily pulled out of the structure.

The anticling additive present in the noncling layer of the subject coextrudate can be any effective antiblock capable of converting the layer to an noncling film. Examples of effective materials are crystalline and amorphous silicas, a synthetic sodium aluminum silicate, diatomaceous earth, talc and the like, having a particle size range of from about 0.5 to about 20 microns. These agents can be present in the noncling layer in a concentration of from about 500 to about 20,000 ppm, preferably from 2500 to 10,000 ppm. Particularly preferred in the stretch wrap films of the present invention is the class of antiblocks known as diatomaceous earth (DE). The use of DE in the preferred HDPE noncling layer has been found to result in particularly low coefficients of dynamic friction. This is indicative of no substantial cling force and the presence of a slip property when the noncling surface is in contact with a like noncling surface, stretched or unstretched, with relative motion therebetween.

In preparing the one-sided cling, one-sided slip stretch wrap films of the present invention, it is preferred to include between the cling and noncling surfaces at least one intermediate layer having sufficient barrier properties to prevent additive migration in either direction. As mentioned, LLDPE's are particularly preferred for this intermediate barrier layer. These should be selected to provide a minimum stretch capability of at least about 200%, with stretch capabilities in excess of 500% particularly preferred. These are determined on the basis of an extrusion of the pure copolymer, as opposed to the final product of coextrusion of this invention.

In preparing the coextrudate of the present invention, any known prior art technique for coextruding the same can be employed. For example, the formulation for the cling layer containing the appropriate amount of cling additive can be fed into the feed hopper of a conventional rotating screw extruder. The extruder screw employed can have a 6-inch diameter and a length to diameter ratio of about 24:1. Satellite extruders are employed for the extrusion of the noncling and intermediate compositions. The satellite extruders comprises a conventional extruder having an extruder screw with a 3.5-inch diameter and a length-to-diameter ratio of about 24:1. Molten resin from the satelite extruders are fed into the cast film die affixed to the end of the extruder for the cling layer through an adaptor specifically designed to join the polymer streams from the satellite extruders to the molten cling layer polymer stream so that it effectively interfaces with the molten surface of that layer. A more complete description of this prior art process may be found in U.S. Pat. No. 3,748,962, the disclosure of which is incorporated herein by reference.

The pallet unitizing techniques described in U.S. Pat. Nos. 3,986,611 and 4,050,221 are contemplated herein. The disclosures of these patents are incorporated herein in their entirety by reference.

The following demonstrate the extent of the unexpected results obtained with the one-sided cling, one-sided slip stretch wrap films of the present invention. The invention is illustrated by the following non-limiting examples:

EXAMPLES 1-2

Utilizing the aforementioned method of extrusion, two three-layer (A/B/C) coextrusions were produced, as shown below, to compare film properties resulting from the use of a high molecular weight cling additive. These films were produced at 0.8 mil gauge with melt temperatures of approximately 500-520° F. for the LLDPE and VLDPE layers and 475-500° F. for the HDPE layer.

| EX | LAYER | PERCENT OF TOTAL FILM THICKNESS | POLYETHYLENE COMPONENT | ADDITIVE |
| --- | --- | --- | --- | --- |
| 1 | A | 10 | 91% Dow 4002 VLDPE 3.3 mi, 0.910 Density | 9% Exxon Parapol 2500 Polyisobutylene, 2600 NMW |
|  | B | 80 | 100% Exxon 3003.37 LLDPE 0.918 Density |  |
|  | C | 10 | 100% Mobil HMA-026 HDPE 14 MI, 0.952 Density |  |
| 2 | A | 10 | 91% Dow 4002 VLDPE 3.3 MI, 0.910 Density | 9% Amoco H-1500 Polyisobutylene, 2060 NMW |
|  | B | 80 | 100% Exxon 3003.37 LLDPE 0.918 Density |  |
|  | C | 10 | 100% Mobil HMA-026 HDPE 14 MI, 0.952 Density |  |

The film of Example 1, which contained high molecular weight polyisobutylene (2600 number average molecular weight), exhibited less tack transfer than the film of Example 2, which contained a polyisobutylene of 2060 number average molecular weight. Improved cling properties were also found with the film of Example 1 in both stretched and unstretched cling testing.

EXAMPLES 3-4

Employing the extrusion techniques of Examples 1-2, two additional three-layer coextrusions were produced. The film of Example 3 utilized an anticling additive so that its impact on the coefficient of friction of the noncling surface could be demonstrated. The films of Examples 3 and 4 were comprised of the following:

| EX | LAYER | PERCENT OF TOTAL FILM THICKNESS | POLYETHYLENE COMPONENT | ADDITIVE |
| --- | --- | --- | --- | --- |
| 3 | A | 10 | 91% Dow 4002 VLDPE 3.3 MI, 0.910 Density | 9% Exxon Parapol 2500 Polyisobutylene, 2600 NMW |
|  | B | 80 | 100% Exxon 3003.37 LLDPE 0.918 Density |  |
|  | C | 10 | 99.5% Mobil HMA-026 HDPE 14 MI, 0.952 Density | 0.5% Superfloss Diatomaceous Earth |
| 4 | A | 10 | 91% Dow 4002 VLDPE 3.3 MI, 0.910 Density | 9% Exxon Parapol 2500 Polyisobutylene, 2600 NMW |
|  | B | 80 | 100% Exxon 3003.37 LLDPE 0.1918 Density |  |
|  | C | 10 | 100% Mobil HMA-026 Hdpe 14 MI, 0.952 Density |  |

These films were produced at 0.8 mil gauge with melt temperatures of approximately 500–520° F. for the LLDPE and VLDPE layers and 475–500° F. for the HDPE layers.

The film of Example 3, which contained 5000 ppm of diatomaceous earth, was found to exhibit superior slip properties as compared to the film of Example 4 which did not contain the anticling additive. The film of Example 3 was found to have a dynamic coefficient of friction, noncling layer to noncling layer of 0.50, stretched and unstretched when dragged against itself. This compares with 0.80 for the film of Example 4. A coefficient of dynamic friction less than 1.0 indicates that there is no cling force present and that a slide or slip property is present when the noncling surfaces are in contact with relative motion therebetween.

Although the present invention has been described with preferred embodiments, it is to be understood that modifications are variations may be utilized without departing from the spirit and scope of this invention, as those skilled in the art will readily understand. Such modifications and variations are considered to be within the purview and scope of the appended claims.

I claim:

1. In a stretch wrap film having one cling surface and one noncling surface, the noncling surface capable of providing a slip property exhibited when the noncling surface is in contact with a like surface of itself with relative motion therebetween, the improvement comprising at least one region positioned between the cling and noncling surfaces of the film, said region being of a polyolefin material selected to provide barrier properties sufficient to maintain the cling and noncling properties of the cling and noncling surfaces.

2. The film of claim 1, further comprising a multilayer coextruded structure having a cling layer, a noncling layer and at least one intermediate polyolefin layer sufficient to maintain the cling and noncling surface properties.

3. The film of claim 2, wherein at least one said intermediate layer has a stretch capability.

4. The film of claim 2, wherein said cling layer contains a cling additive dispersed therein, said cling additive being of a character and in an amount sufficient to maintain said cling layer, in its stretched condition, in cling-contact with said noncling layer, and wherein said noncling layer contains an anticling additive of a character and in an amount sufficient to prevent exertion of a substantial cling force to a layer of itself.

5. The film of claim 4, wherein said cling additive is a member selected from the group consisting of polyisobutylene, ethylene vinyl acetate, amorphous polypropylene, polyterpene, sorbitan monooleate, glycerol monooleate, microcrystalline wax and mixtures thereof.

6. The film of claim 5, wherein said cling additive is polyisobutylene.

7. The film of claim 6, wherein said cling additive is of sufficient molecular weight to reduce migration and pick-off of said additive.

8. The film of claim 7, wherein said cling additive has a number average molecular weight of at least 2500.

9. The film of claim 4, wherein said anti-cling additive is a member selected from the group consisting of a highly subdivided silica, an diatomaceous earth, a silicate and mixtures thereof.

10. The film of claim 9, wherein said anti-cling additive is diatomaceous earth.

11. The film of claim 4, wherein each layer is a polyolefin.

12. The film of claim 11, wherein each layer is generically a polyethylene.

13. The film of claim 4, wherein said cling layer comprises a very low density polyethylene, said very low density polyethylene consisting essentially of ethylene copolymerized with a minor amount of at least one alpha-olefin having 4 to 10 carbon atoms and has a density of from about 0.890 to below 0.915 gm/c.c. and wherein said non-cling layer is a high density polyolefin.

14. The film of claim 13, wherein at least one intermediate layer is a linear low density polyethylene, said linear low density polyethylene consisting essentially of ethylene copolymerized with a minor amount of at least one alphaolefin having 4 to 10 carbon atoms.

15. The film of claim 14, wherein said linear low density polyethylene has a density of from about 0.915 to about 0.940 gm/c.c. and a melt index of about 1–6 and said high density polyethylene has a density of above about 0.940 gm/c.c. and a melt index of between about 1 and 25.

16. The film of claim 15, wherein said linear low density polyethylene has been formed by copolymerization of ethylene with from about 1–10% by weight of a member selected from the group consisting of butene-1;

3-methyl-butene-1; 3-methyl-pentene-1; 4-methyl-pentene-1; 3-methyl-hexene-1; octene-1; decene-1 and mixtures thereof.

17. In a stretch wrap film having one cling surface and one noncling surface, the noncling surface capable of providing a slip property exhibited when the noncling surface is in contact with a like surface of itself with relative motion therebetween, the improvement comprising a high molecular weight cling additive said cling additive is a member selected from the group consisting of an amorphous polypropylene, polyisobutylene, a polyterpene, and mixtures thereof and the molecular weight of said cling additive is sufficient to reduce the migration of said cling additive through the film to the noncling surface and also reduce the transfer of said cling additive from the cling surface of the film.

18. The film of claim 17, wherein said cling additive is a polyisobutylene having a number average molecular weight greater than about 2500.

* * * * *